United States Patent [19]

Cloetens et al.

[11] Patent Number: 4,859,810
[45] Date of Patent: Aug. 22, 1989

[54] WATER-TREE STABLE ELECTRICAL INSULATING POLYMERIC COMPOSITIONS

[75] Inventors: Rudolphe C. Cloetens, Geneva, Switzerland; Jeffrey D. Umpleby, Princeton, N.J.

[73] Assignee: BP Chemicals Limited, London, England

[21] Appl. No.: 162,335

[22] PCT Filed: Jul. 9, 1987

[86] PCT No.: PCT/GB87/00479
§ 371 Date: Feb. 18, 1988
§ 102(e) Date: Feb. 18, 1988

[87] PCT Pub. No.: WO88/00602
PCT Pub. Date: Jan. 28, 1988

[30] Foreign Application Priority Data

Jul. 11, 1986 [GB] United Kingdom ............... 8617004

[51] Int. Cl.$^4$ ........................... C08K 5/55; H01B 3/18
[52] U.S. Cl. ..................... 174/110 PM; 174/110 SR; 524/183

[58] Field of Search ............... 524/183; 117/110 PM, 117/110 SR

[56] References Cited

U.S. PATENT DOCUMENTS

| | | | |
|---|---|---|---|
| 2,949,439 | 8/1960 | Fuchsman et al. | 524/183 |
| 3,131,164 | 4/1964 | Doyle et al. | 524/183 |
| 3,193,521 | 7/1965 | Jasching | 524/183 |
| 4,211,679 | 7/1980 | Mark et al. | 524/183 |
| 4,299,713 | 11/1981 | Maringer et al. | 174/110 SR |

FOREIGN PATENT DOCUMENTS 871639 6/1961 United Kingdom .

*Primary Examiner*—Veronica P. Hoke
*Attorney, Agent, or Firm*—Brooks Haidt Haffner & Delahunty

[57] ABSTRACT

A composition suitable for use as an electrical insulation comprises a polymeric component and a water-tree retardant additive which is either an organo orthoborate of partial ester of boric acid having the formula $B(OR)(OR^1)(OR^2)$ or an organo orthoborate or partial ester of boric acid with a polyhydric hydrocarbyl alcohol.

17 Claims, No Drawings

WATER-TREE STABLE ELECTRICAL INSULATING POLYMERIC COMPOSITIONS

The present invention relates to polymer compositions suitable for use in the field of wire and cable insulation and to a process for the production of such compositions. More particularly the invention relates to polymer compositions which exhibit an improved resistance to the initiation and growth of water trees when employed as medium and high voltage electrical insulation.

Polymer compositions suitable for use as insulating layers for electrical cables are well known. Generally, such compositions are based on polyolefins such as, for example, homopolymers and copolymers of ethylene. The polymer compositions may be used as insulation in an uncross-linked form, but preferably the compositions are cross-linked in order to provide improved high temperature properties.

When used as insulation for medium or high voltage power cable, polyolefins tend to undergo a phenomenon known as "treeing". The term "treeing" has been applied to this type of insulation breakdown because the failure path looks somewhat like the profile of a tree. Two types of "tree" have been identified and these are generally known as "electrical trees" and "water trees". It is generally believed that electrical trees are generated by corona discharges causing fusion and eventual breakdown of the polymer whereas water trees tend to occur in solid dielectric material which is simultaneously exposed to moisture and an electric field. Water treeing is therefore a significant factor in determining the useful life of buried medium and high voltage power cables. Water trees tend to be initiated at sites of high electrical stress such as rough interfaces, protruding conductive points, voids or embedded contaminants. Electrical trees and/or water trees can lead to electrical power leakage or even complete breakdown of the insulation.

A number of proposals for retarding the growth of water trees are suggested in the prior art. DT-A-2737430 describes an insulation composition having reduced tendency to form water trees comprising a polyolefin and an alkoxy silane. US-A-4299713 describes an unfilled polymeric composition for electrical insulation comprising a polymeric component and, as a water treeing and electrical treeing inhibitor for the composition, at least one defined organic compound which is a silicon, tin, titanium, phosphorus or boron compound for example, vinyl-tris-(2-methoxyethoxy) silane. The patent does not disclose specific examples of suitable boron compounds.

It is an object of the present invention to provide a polymeric composition suitable for use as electrical insulation having improved resistance to the initiation and/or growth of water trees.

Accordingly the present invention provides a composition suitable for use as electrical insulation comprising a polymeric component and a water tree retardant additive characterised in that the water tree retardant additive is selected from the group consisting of:
(A) an organo orthoborate or partial ester of boric acid having the general formula;

$$B(OR)(OR^1)(OR^2)$$

in which R is an alkyl, aryl, aralkyl, alkaryl or cycloalkyl group having from 4 to 24 carbon atoms and $R^1$ and $R^2$ are individually hydrogen or an alkyl, aryl, aralkyl, alkaryl or cycloalkyl group having from 4 to 24 carbon atoms and
(B) an organo orthoborate or partial ester of boric acid with a polyhydric hydrocarbyl alcohol.

The present invention further provides a process for preparing a polymeric composition suitable for use as electrical insulation comprising mixing together a polymeric component and a water tree retardant additive characterised in that the water tree retardant additive is selected from the group consisting of:
(A) an organo orthoborate or partial ester of boric acid having the general formula;

$$B(OR)(OR^1)(OR^2)$$

in which R is an alkyl, aryl, aralkyl, alkaryl or cycloalkyl group having from 4 to 24 carbon atoms and $R^1$ and $R^2$ are individually hydrogen or an alkyl, aryl, aralkyl, alkaryl or cycloalkyl group having from 4 to 24 carbon atoms and
(B) an organo orthoborate or partial ester of boric acid with a polyhydric hydrocarbyl alcohol.

The present invention also includes an electric wire or cable comprising an electrical conductor insulated by an insulation layer comprising a polymeric component and a water tree retardant additive characterised in that the water tree retardant additive is selected from the group consisting of:
(A) an organo orthoborate or partial ester of boric acid having the general formula;

$$B(OR)(OR^1)(OR^2)$$

in which R is an alkyl, aryl, aralkyl, alkaryl or cycloalkyl group having from 4 to 24 carbon atoms and $R^1$ and $R^2$ are individually hydrogen or an alkyl, aryl, aralkyl, alkaryl or cycloalkyl group having from 4 to 24 carbon atoms and
(B) an organo orthoborate or partial ester of boric acid with a polyhydric hydrocarbyl alcohol.

Organo orthoborates and partial esters of boric acid are known. Symmetrical trialkyl borates in which R, $R^1$ and $R^2$ in the above general formula are the same alkyl, aryl aralkyl, alkaryl or cycloalkyl group can be readily prepared by direct esterification of boric acid. Other methods of preparing symmetrical trialkyl borates include trans esterification and alcoholysis of boron trichloride. Unsymmetrical orthoborates and orthoborates of polyhydic alcohols are also well characterised in the literature.

Preferably, the water tree retardant additive is a symmetrical orthoborate having the general formula $B(OR)(OR^1)(OR^2)$ in which R, $R^1$ and $R^2$ are the same. More preferably, it is a symmetrical orthoborate in which R, $R^1$ and $R^2$ are the same and comprise an alkyl group having from 8 to 24 carbon atoms. Suitable alkyl groups include octyl, decyl, dodecyl, tetradecyl, hexadecyl and octadecyl groups.

Polyhydric hydrocarbyl alcohols suitable for forming organo orthoborates or partial esters of boric acid for use in the present invention include, for example ethylene glycol, 1,3-propane diol, 1,4-butane diol, 1,5-pentane diol, 1,6-hexane diol and cyclohexane-1,4 diol (quinitol), polyethylene glycol, polypropylene glycol, glycerol, pentaerythritol, and polyvinyl alcohol.

The borate esters and partial esters employed in the composition of the present invention as water tree retardants preferably have relatively low volatility so that they have a reduced tendency to migrate from the composition. It is preferred to employ borate esters which are liquid at temperatures conventionally employed in the art for thermoforming the polymeric component (e.g. polyethylene).

The quantity of water tree retardant additive in the composition of the present invention is suitably from 0.1 to 10%, preferably from 0.3 to 5% by weight, based on the combined weight of the polymeric component and the water tree retardant additive.

The polymeric component comprises a material suitable for use as an electrical insulating material and can be, for example, a homopolymer of ethylene or a copolymer comprising a major proportion of ethylene. The homopolymer or copolymer of ethylene can be, for example, low density polyethylene (LDPE); copolymers of ethylene with alkyl acrylate, copolymers of ethylene with alkyl methacrylate; copolymers of ethylene with vinyl acetate; linear ethylene polymers (e.g. HDPE) or linear ethylene copolymers (e.g. LLDPE). The polymeric component can also be a silyl polymer i.e. a polyolefin having incorporated therein hydrolysable silane groups which form crosslinks by hydrolysis and condensation in the presence of water and, preferably, a silanol condensation catalyst. Such silyl polymers can be prepared, for example, by copolymerising monomeric material such as ethylene with an unsaturated silane compound having hydrolysable groups, by grafting an unsaturated silane compound having hydrolysable groups on to a polymer such as homopolymer or copolymer of ethylene or by transesterification with esters of silane compounds having hydrolysable groups of copolymers of ethylene with esters of unsaturated carboxylic acids (e.g. ethylene ethyl acrylate copolymers) or with vinyl acetate.

The polymeric component can comprise a blend of two or more of the above mentioned polymers.

Particularly preferred as the polymeric component are LDPE, ethylene/ethylacrylate copolymer (EEA), ethylene/butyl acrylate, ethylene/vinyl acetate copolymer (EVA) and linear low density polyethylene or blends of two or more thereof. Particularly preferred blends are LLDPE/LDPE, blends of EEA or ethylene/butyl acrylate copolymer with LDPE, LLDPE or LDPE/LLDPE and blends of EVA with LDPE, LLDPE or LDPE/LLDPE.

Preferably, the ethylene/alkylacrylate or ethylene/vinyl acetate copolymers, if used, contain from 1 to 30 weight % of copolymerised alkyl acrylate or vinyl acetate units based on the weight of the copolymer. A particularly preferred polymeric component comprises a blend of LDPE with ethylene/ethylacrylate copolymer wherein the total ethylacrylate content in the component lies in the range 0.5 to 5 wt %. The aforesaid polymers or blends can also contain other suitable insulating polymeric materials, for example, polypropylene. The melt index of the polymeric component (prior to any crosslinking) suitably lies in the range 0.1 to 10 as measured by ASTM D 1238 (2.16 Kg/190° C.).

The polymer compositions of the present invention are preferably free from filler materials.

Silyl polymers are inherently cross-linkable in that they form crosslinks by hydrolysis and condensation in the presence of water and, preferably, a silanol condensation catalyst. Other polymeric compositions according to the present invention can contain a chemical crosslinking agent (e.g. an organic peroxide or hydroperoxide). Also, polymeric compositions according to the present invention can be crosslinked by the use of ionising radiation, subsequent to forming into useful articles if desired.

In one embodiment of the present invention a crosslinkable composition comprises the polymeric component, the defined water tree retardant additive and an organic peroxide or hydroperoxide crosslinking agent.

Examples of peroxide crosslinking agents suitable for use in this embodiment of the present invention are dicumyl peroxide, 2.5-bis(tertiary butyl peroxy)-2,5-dimethyl hexane, di-tertiary butyl peroxide, benzoyl peroxide, tertiary butyl cumyl peroxide, 2.5-bis(tertiary butyl peroxy)-2,5-dimethyl hexyne and bis (tertiary butyl peroxy) disopropyl benzene. The quantity of organic peroxide for use in such crosslinkable compositions is suitably 0.3 to 10.0 wt %, preferably 0.5 to 5.0 wt % based on the total composition. It will be understood that the peroxide is suitably selected so that it has a relatively long half life (e.g. greater than 0.5 hours) at the processing temperature but a relatively short half life (e.g. less than 10 minutes) at the temperature employed during the subsequent curing step.

In another embodiment of the present invention, a crosslinkable composition comprises, as the polymeric component, a silyl polymer the water tree retardant additive, and a silanol condensation catalyst.

Silyl polymers and their ability to be crosslinked in the presence of water and a silanol condensation catalyst are known in the art. For example, British Patent GB 2,028,831B discloses the preparation of a crosslinkable polyethylene resin composition comprising (A) a copolymer obtained by copolymerising ethylene monomer and a hydrolysable, ethylenically unsaturated silane monomer at elevated temperature and pressure in the presence of a radical initiator and (B) a silanol condensation catalyst. GB 2,039,513A discloses a process for producing insulated electrical conductors which process comprises extrusion coating an electrical conductor with such an ethylene/vinyl silane copolymer and thereafter subjecting the coated conductor to a crosslinking process step comprising causing the coated conductor to contact water in the presence of a silanol condensation catalyst. GB-A-1,357,549, GB-A-1,234,034 and GB-A-1,286,460 disclose silyl polymers produced by grafting a polyolefin with a hydrolysable, ethylenically unsaturated silane compound in the presence of a free radical initiator. A commercial example of a multi-extrusion process for producing silyl polymers by grafting is the SIOPLAS (registered trade mark) process and a commercial example of a single-extrusion process for producing silyl polymers by grafting is the MONOSIL (registered trade mark) process. When the silyl polymer is produced by grafting, the water tree growth retardant additive can be present in the component mixture during the grafting reaction. The "transesterification" method comprises treating a copolymer having exchangeable functions such as alkoxy groups (as, for example, in ethylene/ethyl acrylate copolymer) or carboxylate groups (as, for example, in ethylene/vinyl acetate copolymer) with a suitable silane compound in the presence of a special ester-exchange catalyst. A transesterification method is disclosed, for example, in US-A-4579913.

Preferably, when a silyl polymer is employed as the polymeric component in the composition of the present invention, it contains from 0.1 to 10 weight %, preferably from 0.5 to 5 weight % of copolymerized or grafted units of the unsaturated silane compound. Preferred hydrolysable, unsaturated silane compounds are vinyl trimethoxy silane, vinyl triethoxy silane and vinyl triacetoxy silane. The composition preferably also contains a silanol condensation catalyst, for example a dialkyl tin carboxylate such as dibutyl tin dilaurate or dibutyl tin maleate. The quantity of such catalyst is suitably 0.01 to 5%, preferably 0.03 to 3% by weight based on the quantity of silyl polymer.

The composition of the present invention can be prepared using techniques well known in the art to produce homogeneous dispersions of polymeric materials. The mixing is preferably carried out at a temperature such that the polymeric material is in the form of a melt. When the polymeric component is employed in the form of granules (e.g. pellets or powder) the mixing can be carried out, if desired, by contacting the granules with the water tree growth retardant, optionally with one or more other additives, e.g. antioxidant, under conditions which lead to absorption of the additives by the polymer. Preferably the compound employed as water tree retardant additive is above its melting temperature during the mixing. The components can be mixed, for example, using multi-roll mills, screw mills, continuous mixers, extruders, compounding extruders or Banbury mixers. Minor amounts of other additives, for example, antioxidant, plasticers or processing aids, metal deactivators, pigments, heat and light stabilizers and antistatic agents can be incorporated if desired.

The water tree retardant additives employed in the composition of the present invention exhibit good stability and ease of compounding compared with conventional water tree retardant compounds. They show little or no tendency to exude during thermoforming or to exude from thermoformed products, for example, from wire and cable insulation. Some of the water tree retardant additives also function to provide improved flame retardancy.

The present invention is illustrated in the following Example and Comparative Tests.

EXAMPLE AND COMPARATIVE TESTS

The following compositions intended for use as wire and cable insulation were homogenised using a two-roll mill and the products were compression moulded into plaques by heating the composition in a press finally at 190° C. under a pressure of 25 bar for 15 minutes to cause crosslinking. The moulded plaques were then cooled to room temperature. The plaques were heated to 90° C. in a vacuum over (25 mm Hg pressure) to remove volatile materials before testing.

COMPOSITION A (COMPARATIVE)

A low density polyethylene composition sold commercially by BP Chemicals under the trade designation HFDM 4201 comprising low density polyethylene, dicumyl peroxide (1.8 weight %) and a conventional antioxidant.

COMPOSITION B (COMPARATIVE)

A commercially available composition sold commercially by BP Chemicals under the trade designation BPH-4201 comprising a blend of low density polyethylene, ethylene/ethyl acrylate copolymer, dicumyl peroxide (1.8 weight %) and a conventional antioxidant.

COMPOSITION C (INVENTION)

As composition B, but additionally containing 1% by weight (based on total composition) of tridodecyl borate.

The water tree growth rate (WTGR) of each of the plaques was determined using a test method similar to that described in European Patent Application EP-A-0023239.

A compression moulded dish-shaped specimen approximately 150mm in diameter was prepared for each composition. The geometry of the dish-shaped specimen was substantially as shown in EP 0,023,239. 24 conical depressions were moulded into the bottom of the dish. 100ml of an electrolyte solution comprising a 0.01 N solution of sodium chloride was poured into the dish which was then placed into an earthed bath, containing the same electrolyte solution. A 50mm diameter platinum wire ring was then immersed in the electrolyte in the sample dish and connected to the voltage source. The temperature at which the test was carried out was 65° C., the frequency was 6KHz at 5 kV and the time for which test was carried out was 72 hours.

To measure the length of the water trees formed, the twelve conical depressions nearest to the centre of the dish-shaped test specimen were punched out using a circular die and an arbor press. The punched-out discs of specimens were placed in a boiling solution of 0.5g methylene blue and 8ml concentrated aqueous ammonia (28% approx.) in 250ml of distilled water for 30 minutes. The discs were then sectioned and mounted on microscope slides for examination. The water tree growth rate was obtained by measuring the length of the water trees and calculating the rate constant for water treeing for each composition using the equations disclosed in EP 23,239. The rate constant k for each composition is given in the Table together with the relative water tree growth rate (WTGR) which is the ratio of the rate constant for the composition to the rate constant of a reference composition in this case Composition A (i.e. k/kref.). The results clearly demonstrate the reduction in the water tree growth rate of the composition according to the present invention.

TABLE

| Composition | K (mm$^3$/hr × V$^2$) | WTGR (k/k ref) |
| --- | --- | --- |
| A | 2.96 × 10$^{-11}$ | 1.00 |
| B | 7.29 × 10$^{-12}$ | 0.246 |
| C | 3.38 × 10$^{-12}$ | 0.114 |

We claim:

1. An electrical wire or cable comprising an electrical conductor and insulation comprising a polymeric component and a water tree retardant additive wherein the water tree retardant additive is selected from the group consisting of:

(A) an organo orthoborate or partial ester of boric acid having the general formula:

B (OR) (OR$^1$) (OR$^2$)

in which R is an alkyl, aryl, aralkyl, alkaryl or cycloalkyl group having from 4 to 24 carbon atoms and R$^1$ and R$^2$ are individually hydrogen or an alkyl, aryl, aralkyl, alkaryl or cycloalkyl group having from 4 to 24 carbon atoms and (B) an organo orthoborate or partial ester of boric acid with a polyhydric hydrocarbyl alcohol.

2. An electrical wire or cable as claimed in claim 1 in which the water tree retardant additive is a symmetrical orthoborate.

3. An electrical wire or cable as claimed in claim 2 in which the symmetrical orthoborate has the general formula $B(OR)(OR^1)OR^2$ in which R, $R^1$ and $R^2$ are the same and comprise an alkyl group having from 8 to 24 carbon atoms.

4. An electrical wire and cable as claimed in claim 3 in which the water tree retardant additive is a symmetrical orthoborate having the general formula $B(OR)(OR^1)(OR^2)$ in which R, $R^1$ and $R^2$ are the same alkyl group selected from the group consisting of octyl, decyl, dodecyl, tetradecyl, hexadecyl and octadecyl.

5. A electrical wire and cable as claimed in claim 1 in which the water tree retardant additive is an organo orthoborate or partial ester of boric acid with a polyhydric hydrocarbyl alcohol selected from the group consisting of ethylene glycol, 1,3-propane diol, 1,4-butane diol, 1,5-pentane diol, 1,6-hexane diol, cyclohexane-1,4-diol, polyethylene glycol, polypropylene glycol, glycerol, pentaerythritol and poly vinyl alcohol.

6. An electrical wire or cable as claimed in any one of the claims 1 to 5 in which the amount of the water tree retardant additive is from 0.1 to 10% by weight based on the combined weight of the polymeric component and the water tree retardant additive.

7. An electrical wire or cable as claimed in claim 6 in which the amount of the water tree retardant additive is from 0.3 to 5% by weight.

8. An electrical wire or cable as claimed in any one of claims 1 to 18 in which the polymeric component is a homopolymer of ethylene or a copolymer comprising a major proportion of ethylene.

9. An electrical wire or cable as claimed in claim 8 in which the amount of the water tree retardant additive is from 0.1 to 10% by weight based on the combined weight of the polymeric component and the water tree retardant additive.

10. An electrical wire or cable as claimed in claim 9 in which the amount of the water tree retardant additive is from 0.3 to 5% by weight.

11. An electrical wire or cable as claimed in claim 8 in which the polymeric component is selected from the group consisting of low density polyethylene, high density polyethylene, linear low density polyethylene copolymers, copolymers of ethylene with alkyl acrylate, copolymers of ethylene with alkyl methacrylate, copolymers of ethylene with vinyl acetate, silyl polymers and blends thereof.

12. An electrical wire or cable as claimed in claim 11 in which the polymeric component comprises a blend of ethylene-ethyl acrylate copolymer with low density polyethylene in which the total ethyl acrylate content in the component is from 0.5 to 5% by weight.

13. An electrical wire or cable as claimed in claim 1 in which the water tree retardant additive is tridodecyl borate.

14. An electrical wire or cable as claimed in claim 12 in which the water tree retardant additive is tridodecyl borate.

15. A process for improving resistance to the initiation and/or growth of water trees in a polymeric composition used as electrical insulation which comprises insulating an electrical conductor with a polymeric composition comprising a polymeric component and a water tree retardant additive wherein the water tree retardant is selected from the group consisting of:

(A) an organo orthoborate or partial ester of boric acid having the general formula:

$$B(OR)(OR^1)(OR^2)$$

in which R is an alkyl, aryl, aralkyl, alkaryl or cycloalkyl group having from 4 to 24 carbon atoms and $R^1$ and $R^2$ are individually hydrogen or an alkyl, aryl, aralkyl, alkaryl or cycloalkyl group having from 4 to 24 carbon atoms and (B) an organo orthoborate or partial ester of boric acid with a polyhydric hydrocarbyl alcohol.

16. A process as claimed in claim 15 in which the polymeric component is a homopolymer of ethylene or a copolymer comprising a major proportion of ethylene.

17. A polymeric composition suitable for use as electrical insulation, comprising: a polymeric component which comprises a blend of ethylene-ethyl acrylate copolymer with low density polyethylene in which the total ethyl acrylate content is from 0.5 to 5% by weight, and a water tree retardant additive which is an organo orthoborate or partial ester of boric acid with a polyhydric hydrocarbyl alcohol.

* * * * *

UNITED STATES PATENT AND TRADEMARK OFFICE
CERTIFICATE OF CORRECTION

PATENT NO. : 4,859,810
DATED : August 22, 1989
INVENTOR(S) : Rudolphe C. Cloetens et al It is certified that error appears in the above-identified patent and that said Letters Patent is hereby corrected as shown below:

Col. 7, Claim 8, l. 34, should read "claims 1 to 5"

Signed and Sealed this

Twenty-fifth Day of December, 1990

*Attest:*

HARRY F. MANBECK, JR.

*Attesting Officer*     *Commissioner of Patents and Trademarks*